United States Patent Office 3,528,683
Patented Sept. 15, 1970

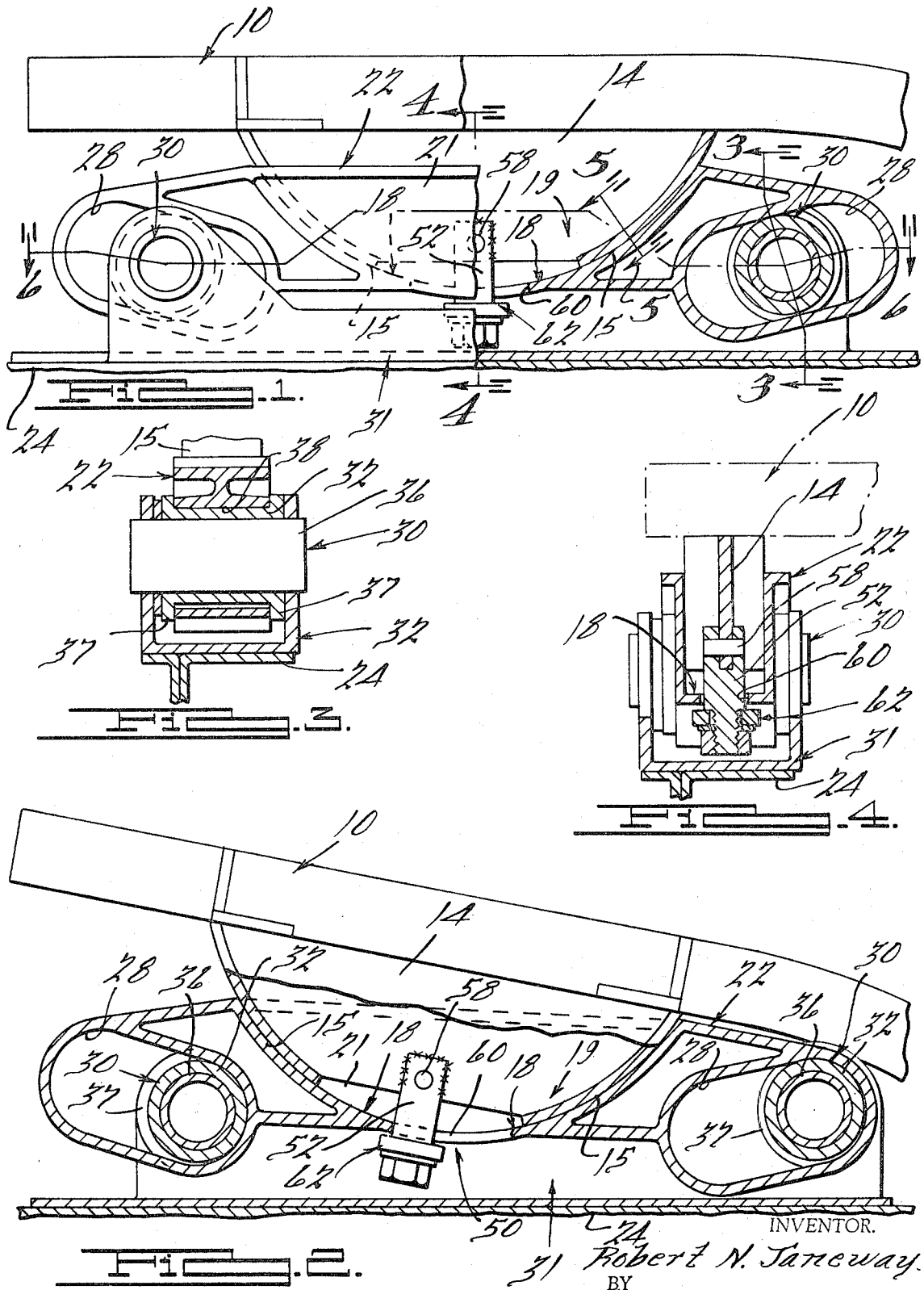

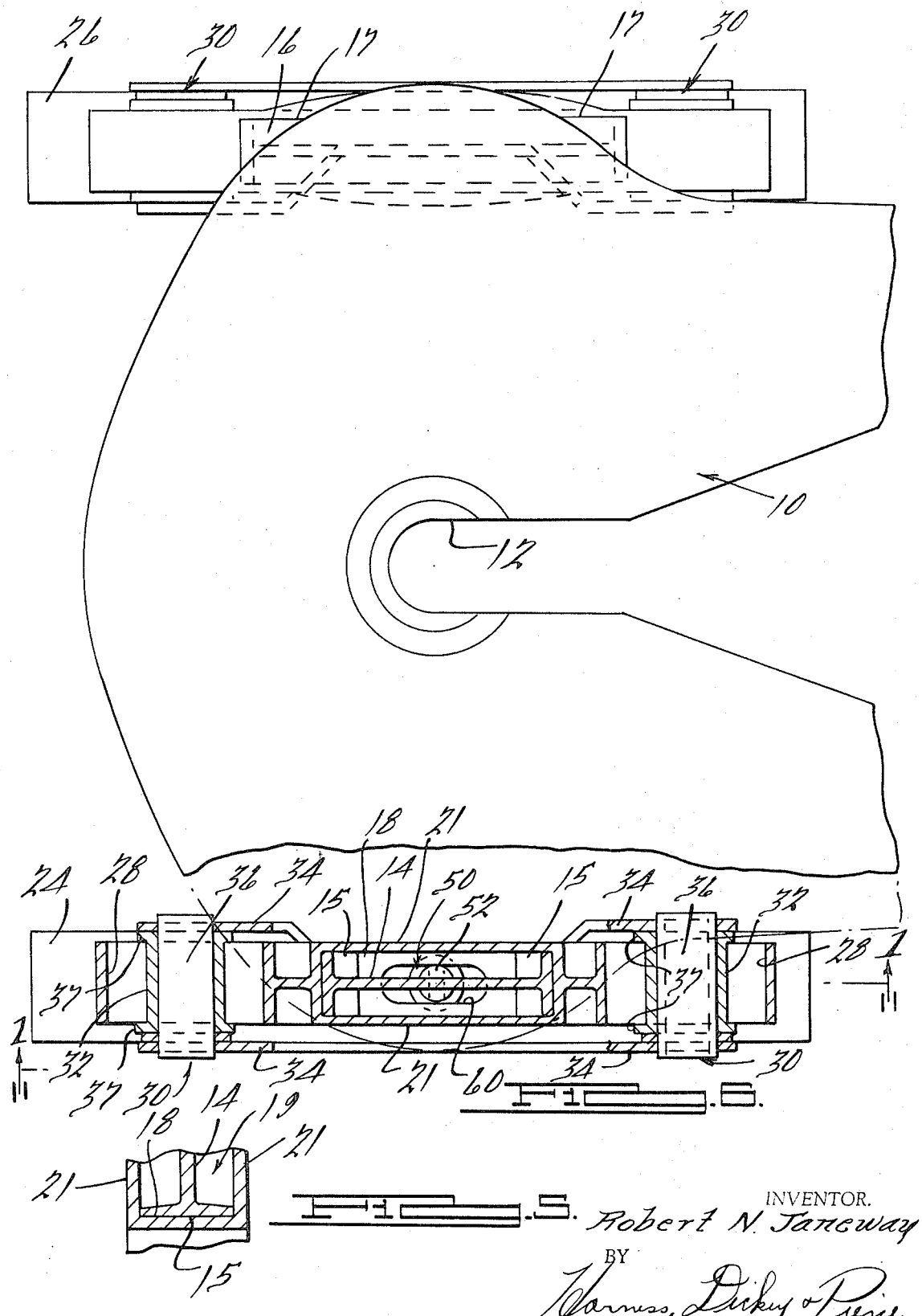

3,528,683
TRACTOR-TRAILER FIFTH WHEEL COUPLING
Robert N. Janeway, 8120 E. Jefferson Ave.,
Detroit, Mich. 48214
Filed June 7, 1968, Ser. No. 735,429
Int. Cl. B62d *53/08*
U.S. Cl. 280—438                                    9 Claims

ABSTRACT OF THE DISCLOSURE

A tractor-trailer fifth wheel coupling which has a first, generally friction free pivot connection of limited angular travel effective about an elevated horizontal pivot axis, and which coupling has a second, low level pivot connection incorporating high friction to ensure normal oscillation about the elevated pivot, but accommodating extreme angularity conditions between tractor and trailer.

SUMMARY OF THE INVENTION

The present invention relates to tractor-trailer fifth wheel couplings, and particularly to improvements in a friction free fifth wheel coupling of the type that elevates the effective horizontal pivot axis of the fifth wheel coupling to a position where the fore and aft motion caused by tractor and/or trailer pitching and transmitted to the tractor operator is greatly reduced and such as that disclosed in my U.S. Letters Patents No. 2,958,542, issued Nov. 1, 1960 and No. 3,241,860, issued Mar. 22, 1966 the disclosures of which are incorporated herein by reference.

In the latter patent a supplementary, low level pivot was provided which, in addition to the elevated pivot axis, alternatively permitted limited, low level pivot operation. It was found that, under certain operating conditions it would be desirable if both pivots could be simultaneously effective to accommodate extreme angularity conditions between tractor and trailer. However, in the construction of the latter patent it was necessary to lock out the supplementary low pivot to ensure oscillation about the elevated pivot axis in normal operation.

With the construction of the present invention a supplementary low level pivot is provided which is not locked in fixed positions but is free to move; the low level pivot is formed by a connection which will pivot at high loads only. Thus for normal operation the low friction elevated pivot alone will be operable up to a limited angular range of action and under heavy driving loads or extreme angularity conditions between the tractor and trailer the low level pivot will be actuable whereby any required angularity condition will be automatically accommodated. In the form of the invention shown a high friction, sliding connection is used which requires higher actuating forces than the low (rolling resistance) friction of the connection for the elevated axis.

Therefore, it is an object of the present invention to provide a fifth wheel coupling having automatically actuable high and low pivot connections with the high pivot connection being operable alone under normal operating conditions and with the low pivot connection being operable under high driving loads or conditions requiring extreme angularity between tractor and trailer.

It is another object to provide a fifth wheel which is of the above described type which is of a simplified construction.

It is a general object to provide a new and improved fifth wheel.

Other objects, features, and advantages of the present invention will become apparent from the subsequent description and the appended claims, taken in conjunction with the accompanying drawings, in which:

FIG. 1 is a side elevational, partial sectional view, of a fifth wheel exemplifying features of the present invention and is generally as viewed along the lines 1—1 in FIG. 6;

FIG. 2 is a view similar to FIG. 1 showing the fifth wheel in a tilted trailer coupling position;

FIG. 3 is a sectional view taken generally along the line 3—3 in FIG. 1;

FIG. 4 is a sectional view taken generally along the line 4—4 in FIG. 1;

FIG. 5 is a sectional view taken generally along the line 5—5 in FIG. 1; and

FIG. 6 is a view taken generally along the line 6—6 in FIG. 1.

Generally speaking, the coupling comprises a skid plate 10 of conventional upper exterior configuration, having the usual trailer kingpin receiving segmental slot 12. A pair of projections or webs 14 and 16 depend from each side thereof in horizontal transverse alignment with one another and have generally semi-circular support surfaces 15 and 17, respectively. The support surfaces 15 and 17 are axially flat and are matably received within similarly arcuately extending surfaces 18 of cavities 19 formed in the sides of generally channel-shaped carriages 22. The cavities 19 in addition to having arcuate surfaces also have side surfaces 21 which receive in close clearance the surfaces 15 and 18 (FIG. 5). The carriages, two of which are provided, overlie side rails 24 and 26, respectively, of the associated tractor chassis frame. Thus the skid plate 10 is pivotally supported upon the carriage 22 by the connection between the semicircular support surfaces 15 and 17 and arcuate surfaces 18 which connection defines the low level pivot, i.e. having its pivot axis at the common center of the circular arcs defining the surfaces 15, 17 and 18. The low level pivot functions in a manner to be described. Each of the sides of each carriage is provided at the forward and rearward ends thereof with an arcuate shaped slot 28. Each slot 28 is of substantially uniform width, and all are of substantially the same size. The centers of curvature for each of these four slots lie on a common horizontal transverse axis disposed substantially above the skid plate, in the manner taught by the aforementioned Letters Patents.

Each carriage does not rest directly upon the side rail of the tractor frame but is supported for rotational oscillation with respect to the frame by means of two longitudinally spaced substantially friction free roller assemblies 30 rigidly secured to the top of the associated side rail by a support channel 31. The forward roller assemblies are positioned within the forward slots of each of the carriages, for rolling supporting engagement therewith, and the rearward roller assemblies are similarly positioned within the rearward slots of each of the carriages. Consequently, each carriage is secured to the tractor frame in such a way that relative movement therebetween is along an arcuate path about an axis which lies transversely to and substantially above the skid plate, and movement along this path is substantially friction free.

As best seen in FIGS. 1–3 and 6, each roller assembly comprises a slot engaging roller 32 journaled for rotation upon a shaft 36 which is tightly secured to a pair of horizontally spaced ears or flanges 34 which extend upwardly from the support channel 31. Each of the rollers 32 have flanges 37 at opposite ends which overlap the confronting side surfaces of the slot 28 and guide the skid plate 10 as it moves. Under normal operating conditions it is desirable that skid plate 10 be disposed substantially parallel to the side rails of the tractor frame, as seen in FIG. 1; however, in order to easily receive a trailer it is desirable that the skid plate be capable of tilting downwardly and rearwardly in the manner shown in FIG. 2. This is facilitated by means of the low level pivot connection by which the skid plate 10 can be tilted. In addition to facilitating reception of the trailer, the low level pivot also permits automatic pivoting or tilting of the skid plate 10 under extreme angularity conditions between trailer and tractor. Note that pivoting about the low level connection is through the sliding, frictional engagement between support surfaces 15 and 17 and the complementary arcuate surfaces 18 of the cavities 19. If desired, arcuate surfaces 15 and 17 or surfaces 18 may be provided with a layer of friction material, such as brake lining. This sliding frictional engagement requires substantially higher applied torque to pivot the skid plate 10 about the low level pivot than that required to pivot the skid plate 10 about the generally friction free elevated pivot axis (as defined by the roller assemblies 30 and slots 28). Thus for normal operation the skid plate 10 pivots about the elevated axis (generally in the order of two to three degrees), and for extreme angularity conditions exceeding the range of rolling movement in the slots 28 (e.g., in the order of as much as ten to twenty degrees) the skid plate will automatically be forced to pivot about the low level pivot.

Separation of the skid plate 10 from the carriages 22 is prevented by a pair of fastener assemblies 50 which include studs 52 which are fixedly pinned to webs 14 and 16 by pins 58 extending through bifurcated upper end of studs 52. Studs 52 are also preferably welded to webs 14 and 16. Webs 14 and 16, respectively, have the semicircular support surfaces 15 and 17 secured to their lower ends. The surfaces 15 and 17 are interrupted centrally along the bottom edges of the webs 14 and 16 to provide a mounting location for studs 52.

A longitudinally extending slot 60 is located in the support surfaces 18 of the cavities 19, the slot 60 being generally centrally located to be in line with the interrupted portions of support surfaces 15 and 17, so that the studs 52 will extend through slots 60. Washers 62, secured by suitable nut and locking means, bear against shoulders on studs 52, and overlap slots 60 to prevent separation between skid plate 10 and carriages 22. Clearance is provided between the washers 62 and the undersides of carriages 22, to permit free pivotal movement of the skid plate 10 relative to carriages 22 via the lower pivot connection.

While frictional torque and the restoring moment of gravity (the weight of the trailer continuously tends to center each pair of rollers in their respective slots) are sufficient to transmit normal driving forces without exceeding the range of action about the elevated pivot axis permitted by the carriage slots 28, greater driving forces, as in starting acceleration, are taken solidly (or through cushioning material) between the rollers 30 and the ends of slots 28. The lower pivots can then accommodate any angularity assumed by the tractor frame relative to the skid plate 10.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A tractor-trailer fifth wheel coupling comprising: a skid plate; means on said skid plate for connection to a trailer; and means for supporting said skid plate on the tractor including first pivot means connecting said skid plate with the tractor and operative therebetween in response to a torque of a first magnitude for pivotal movement about a horizontal transverse first axis above said skid plate, and second pivot means connecting said skid plate with the tractor and operative therebetween only in response to a torque of a second magnitude greater than said first magnitude for pivotal movement about a horizontal transverse second axis below said first axis.

2. The fifth wheel of claim 1 wherein said first pivot means comprises a generally friction free connection, said second pivot means comprising a sliding, frictional connection.

3. The fifth wheel of claim 2 wherein said second pivot means comprises a support member having an arcuate support surface connected to said skid plate and further comprising a cavity having an arcuate surface portion for matably receiving said support surface for frictional sliding engagement.

4. The fifth wheel of claim 1 wherein said first pivot means comprising a plurality of rollers supported in a plurality of arcuate slots for providing a generally friction free connection.

5. The fifth wheel of claim 1 wherein said first pivot means permits only limited angular movement between the tractor and said skid plate and said second pivot means is capable of permitting greater angularity between the tractor and said skid plate.

6. A tractor-trailer fifth wheel coupling comprising: a skid plate; means on said skid plate for connection to a trailer; and means for supporting said skid plate on the tractor including first pivot means connecting said skid plate with the tractor and operative therebetween in response to a torque of a first magnitude and second pivot means connecting said skid plate with the tractor and operative therebetween only in response to a torque of a second magnitude greater than said first magnitude.

7. The fifth wheel of claim 6 wherein said first pivot means comprises a generally friction free connection and said second pivot means comprises a sliding frictional connection.

8. A tractor-trailer fifth wheel coupling comprising: a skid plate; means on said skid plate for connection to a trailer; carriage means on the tractor for supporting said skid plate; first pivot means connecting the tractor with said carriage means and operative therebetween in response to a torque of a first magnitude for pivotal movement about a horizontal, transverse first axis above said skid plate; and second pivot means connecting said skid plate with said carriage means and operative therebetween only in response to a torque of a second magnitude greater than said first magnitude for pivotal movement about a horizontal, transverse second axis below said first axis.

9. The fifth wheel of claim 8 wherein said first pivot means comprises a generally friction free connection, said second pivot means comprising a sliding, frictional connection.

References Cited

UNITED STATES PATENTS

| | | | |
|---|---|---|---|
| 2,809,851 | 8/1957 | Beck | 280—438 |
| 2,933,331 | 4/1960 | Stamm | 280—438 |
| 2,958,542 | 11/1960 | Janeway | 280—438 |
| 3,092,399 | 6/1963 | Hais | 280—438 |
| 3,203,712 | 8/1965 | Lorrin | 280—438 |
| 3,241,860 | 3/1966 | Janeway | 280—438 |

LEO FRIAGLIA, Primary Examiner